United States Patent
Shen et al.

(10) Patent No.: US 11,884,835 B2
(45) Date of Patent: Jan. 30, 2024

(54) HYBRID COATING FOR ROOF APPLICATIONS

(71) Applicant: JOHNS MANVILLE, Denver, CO (US)

(72) Inventors: ChangQing Shen, Centennial, CO (US); Joel Hazy, Brighton, CO (US); Julian Metz, Denver, CO (US); Lance Wang, Parker, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/879,080

(22) Filed: Aug. 2, 2022

(65) Prior Publication Data

US 2022/0372325 A1 Nov. 24, 2022

Related U.S. Application Data

(62) Division of application No. 16/785,791, filed on Feb. 10, 2020, now Pat. No. 11,466,174, which is a (Continued)

(51) Int. Cl.
| | |
|---|---|
| *C09D 133/16* | (2006.01) |
| *E04D 11/02* | (2006.01) |

(Continued)

(52) U.S. Cl.
CPC ............ *C09D 133/16* (2013.01); *C04B 14/42* (2013.01); *C04B 16/04* (2013.01); *C04B 20/1033* (2013.01); *C04B 20/1051* (2013.01); *C04B 26/26* (2013.01); *C04B 41/009* (2013.01); *C04B 41/4842* (2013.01); *C04B 41/4922* (2013.01); *C04B 41/5024* (2013.01); *C08K 9/04* (2013.01);

(Continued)

(58) Field of Classification Search
CPC ....... C09D 133/16; C04B 14/42; C04B 16/04; C04B 20/1033; C04B 20/1051; C04B 26/26; C04B 41/009; C04B 41/4842; C04B 41/4922; C04B 41/5024; C04B 2111/00586; C04B 2111/00612; C04B 2111/27; C08K 9/04; E04D 5/02; E04D 5/10; E04D 5/12; E04D 7/005; E04D 11/02

See application file for complete search history.

(56) References Cited

U.S. PATENT DOCUMENTS

| 6,113,978 A | 9/2000 | Ornstein et al. |
| 8,865,303 B2 | 10/2014 | Sexauer |

(Continued)

OTHER PUBLICATIONS

Wang, Lance et al., Cool Roof Systems and Methods, U.S. Appl. No. 15/184,513, filed Jun. 6, 2016.

*Primary Examiner* — Nathan L Van Sell
(74) *Attorney, Agent, or Firm* — Robert D. Touslee

(57) ABSTRACT

Embodiments may include a coated granule for roofing systems. The coated granule may include an aluminum silicate granule and a coating disposed on the aluminum silicate granule. The coating may include a copolymer and a siloxane-based or a silane-based compound. The copolymer may be a cationic fluorinated (meth)acrylic copolymer. The aluminum silicate granule may have a particle size in a range from 0.2 mm to 2.4 mm. The aluminum silicate granule may have a 65% or greater reflectivity. The coated granule may repel oil and maintain its reflectivity better than with other techniques.

20 Claims, 8 Drawing Sheets

Related U.S. Application Data division of application No. 15/691,553, filed on Aug. 30, 2017, now Pat. No. 10,597,555.

(51) Int. Cl.
| | |
|---|---|
| *E04D 5/12* | (2006.01) |
| *E04D 5/02* | (2006.01) |
| *C04B 26/26* | (2006.01) |
| *C04B 14/42* | (2006.01) |
| *C04B 16/04* | (2006.01) |
| *C04B 41/00* | (2006.01) |
| *C04B 41/50* | (2006.01) |
| *C04B 41/48* | (2006.01) |
| *C04B 41/49* | (2006.01) |
| *C04B 20/10* | (2006.01) |
| *E04D 5/10* | (2006.01) |
| *E04D 7/00* | (2006.01) |
| *C08K 9/04* | (2006.01) |
| *C04B 111/00* | (2006.01) |
| *C04B 111/27* | (2006.01) |

(52) U.S. Cl.
CPC ............... *E04D 5/02* (2013.01); *E04D 5/10* (2013.01); *E04D 5/12* (2013.01); *E04D 7/005* (2013.01); *E04D 11/02* (2013.01); *C04B 2111/00586* (2013.01); *C04B 2111/00612* (2013.01); *C04B 2111/27* (2013.01)

(56) References Cited

U.S. PATENT DOCUMENTS

| | | |
|---|---|---|
| 2005/0238848 A1 | 10/2005 | Fensel et al. |
| 2011/0081537 A1 | 4/2011 | Sexauer et al. |
| 2011/0257295 A1* | 10/2011 | Li .................. C04B 18/02 |
| | | 427/221 |
| 2015/0259922 A1 | 9/2015 | Sexauer |

* cited by examiner

HYBRID COATING FOR ROOF APPLICATIONS

CROSS-REFERENCE TO RELATED APPLICATIONS

This application is a division of U.S. application Ser. No. 16/785,791 filed Feb. 10, 2020, which is a division of U.S. application Ser. No. 15/691,553 filed Aug. 30, 2017, now U.S. Pat. No. 10,597,555 issued Mar. 24, 2020. The entire contents of the above-identified applications are herein incorporated by reference for all purposes.

BACKGROUND

Commercial, industrial, and/or residential buildings may have roofing systems with a metal deck, lightweight concrete, structural concrete, or wood deck (e.g., low-slope roof deck). These roofing systems usually have one or more layers of insulation on top of the roof deck and one or more waterproof layers that protect the insulation from moisture. However, without protection from the sun's ultraviolet light the waterproof layers may decompose or breakdown. For example, the ultraviolet light may break polymer chains in the water proofing material. As the polymer chains break the water proofing material becomes brittle and susceptible to cracking and/or breaking. To protect the waterproof layers, some roofing systems place granules on top of the waterproof layers. The granules protect the underlying waterproof layers by absorbing and/or reflecting ultraviolet light. However, granules are typically colored (e.g., have a low reflectivity) and therefore absorb significant amounts of energy during the day, which may increase cooling costs.

BRIEF SUMMARY

Embodiments may allow for better performance in granules used in roofing systems. Specifically, granules may retain more of their solar reflectivity for longer periods of time. A high solar reflectivity in coated granules may allow for improved cool roof systems. The higher solar reflectivity may be possible as a result of a coating that repels oils, including those related to asphalt, from infiltrating the granules. The coatings may have a mixture of a siloxane-based or silane-based compound with a fluorinated copolymer. The two compounds may help repel both water and oil. The two compounds may work together synergistically to allow for lower percentages of copolymer to effectively repel oil. The siloxane-based or silane-based compound may enable the copolymer to coat the granule more effectively or evenly than if the copolymer were applied alone. Coatings of the present technology may be applied in small amounts while still being effective in maintaining solar reflectivity of the granules. As a result, the granules and roofing systems including the granules may be more economical and more efficient.

Embodiments may include a coated granule for roofing systems. The coated granule may include an aluminum silicate granule and a coating disposed on the aluminum silicate granule. The coating may include a copolymer and a siloxane-based or a silane-based compound. The copolymer may be a cationic fluorinated (meth)acrylic copolymer. The aluminum silicate granule may have a particle size in a range from 0.2 mm to 2.4 mm. The aluminum silicate granule may have a 65% or greater reflectivity.

Embodiments may include a membrane roofing system. The membrane roofing system may include a waterproof layer configured to protect an insulation layer. The system may also include a coated granule in contact with the waterproof layer. The coated granule may include a copolymer and a siloxane-based or a silane-based compound. The coating may include a copolymer and a siloxane-based or a silane-based compound. The copolymer may be a cationic fluorinated (meth)acrylic copolymer. The aluminum silicate granule may have a particle size in a range from 0.2 mm to 2.4 mm. The coated granule may have a 65% or greater reflectivity.

Embodiments may include a method of manufacturing a roofing system. The method may include coating a plurality of aluminum silicate granules with a coating. The plurality of aluminum silicate granules may have a particle size in a range from 0.2 mm to 2.4 mm. The plurality of aluminum silicate granules may have a 65% or greater reflectivity. The coating may include a copolymer and a siloxane-based or silane-based compound. The copolymer may be a cationic fluorinated (meth)acrylic copolymer. The method may also include drying the coating on the plurality of aluminum silicate granules to form a plurality of coated granules. The method may further include affixing the plurality of coated granules to a waterproof layer.

Embodiments may include a method of quantifying repellency of a granule. The method may include contacting a plurality of granules with a surface of a liquid. The method may also include collecting a portion of the plurality of granules, where the portion of the plurality of granules have sunk in the liquid. The portion of the plurality of granules that sink may be a result of the liquid penetrating the granule. The method may further include determining the amount of the portion of the plurality of granules.

A better understanding of the nature and advantages of embodiments of the present invention may be gained with reference to the following detailed description and the accompanying drawings.

BRIEF DESCRIPTION OF THE DRAWINGS

The present invention is described in conjunction with the appended figures.

DETAILED DESCRIPTION

Figure 1:
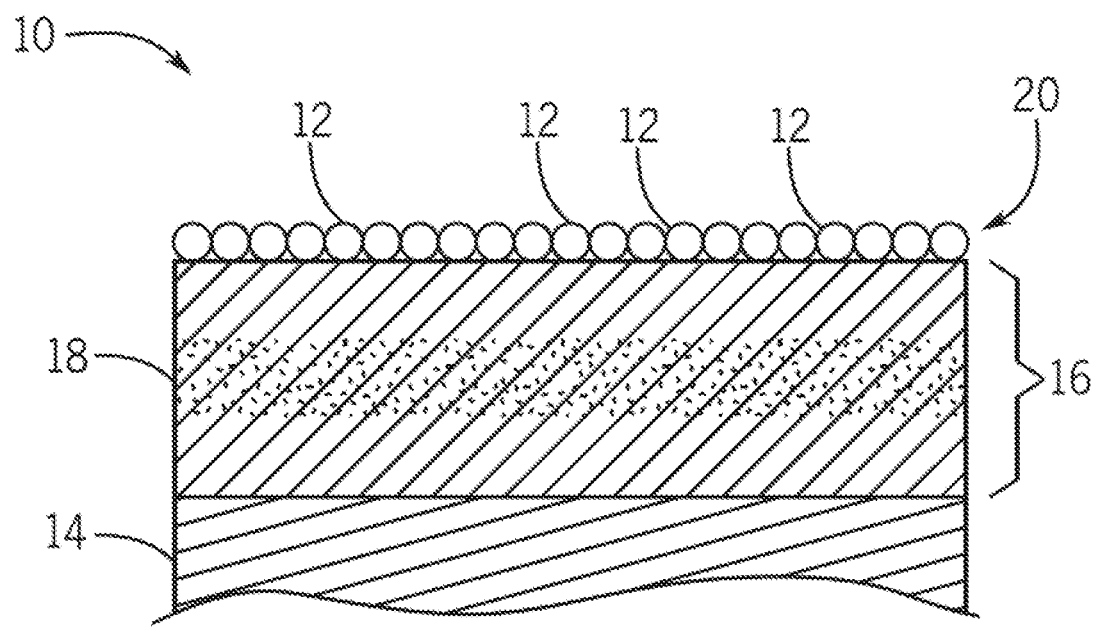
FIG. 1 is a cross-sectional view of a membrane roofing system with granules according to embodiments of the present technology.

Cool roof systems, by reflecting light and reducing heating of the roof, may allow for longer lasting roofing systems.

A decreased heat load on the roof may also decrease the cooling needed in the building covered by the roof. The cool roof system may decrease energy usage in the building. As a result, a cool roof increases the efficiency and economics of the building. To achieve high solar reflectivity in a roof, some conventional methods involve coating both a roof membrane and granules on the membrane with a highly reflective material. Applying a coating to both membranes and granules may increase costs and complexity to the process. A highly reflective coating also may be susceptible to staining and losing reflectivity as coatings may not be too thick.

Another option to providing high reflectivity may be to provide highly reflective granules. The granules may lose their reflectivity over time through absorbing oils from asphalt or otherwise degrading. One method to maintain high reflectivity of granules is to apply a coating to just the granules. Conventional coatings may not repel oil and may not prevent staining of the granules enough, or conventional coatings may be applied at thicker amounts, which may be less cost effective. Some coatings (including those with acrylic copolymers, vinylidene fluoride copolymers, and/or siloxane copolymers) have been shown to fail water repellency tests and/or stain tests (e.g., U.S. 8,865,303).

Embodiments of the present technology may allow for granules to retain more of their solar reflectivity for longer periods of time. As a result, roofing systems with the granules may retain their overall reflectivity properties for longer. The greater retention of solar reflectivity in coated granules may be related to a hybrid coating that repels oils from infiltrating the granules. The hybrid coatings may be a mixture of a siloxane-based or silane-based compound with a fluorinated (meth)acrylic copolymer. The siloxane-based or silane-based compound may repel water from the granule. The fluorinated (meth)acrylic copolymer may repel oil from the granule. However, the copolymer may normally have an ionic bond with the granule, which may make spreading the copolymer evenly over the granule difficult. The siloxane-based or silane-based compound may reduce the bonding between the copolymer and the granule and may aid the coating of the copolymer onto the granule. As a result, a smaller amount of the copolymer may be used to achieve the same oil retention as when the copolymer is used by itself. The hybrid coating may allow for more economical and higher performing granules and roof systems.

The embodiments discussed below may include a roofing system with granules coated with cationic fluorinated (meth)acrylic copolymer and a siloxane-based or silane-based compound. The cationic fluorinated (meth)acrylic copolymer may enable the granules to resist and/or block absorption/adsorption of asphaltic chemicals that may leach out of the waterproof layer. Absorption and/or adsorption of asphaltic chemicals may change the color of the granules and thus their reflectivity. By resisting absorption/adsorption of color changing substances from the waterproof layer, the cationic fluorinated (meth)acrylic copolymer may enable highly reflective granules to maintain their reflectivity. The greater the granule's reflectivity, the less energy absorbed by the roof, which may reduce power consumption by building climate control systems.

FIG. 1 is a cross-sectional view of an embodiment of a membrane roofing system 10 with granules 12. The membrane roofing system 10 may include one or more insulation layers 14 that resist heat transfer through the roof of a building. To protect the insulation layer(s) 14 from the environment (e.g., rain, snow), the membrane roofing system 10 may include one or more waterproof layers or membranes 16. In some embodiments, the waterproof layer 16 may be reinforced with a matrix 18 (e.g., fiberglass, polyester, or fiberglass/polyester combination reinforcement) that increases the tensile strength and tear resistance of the waterproof layer 16.

The waterproof layers 16 may be an asphalt-based material (e.g., Styrene-Butadiene-Styrene (SBS) Modified Asphalt, Atactic Polypropylene (APP) Modified Asphalt, or Oxidized Asphalt Coating). Asphaltic chemicals may be highly complex chemicals containing saturated and unsaturated aliphatic and aromatic compounds with up to 150 carbon atoms. Their composition may vary depending on the source of crude oil. Many of the compounds contain oxygen, nitrogen, sulfur, and other heteroatoms. Asphalt typically contains about 80% by weight of carbon; around 10% hydrogen; up to 6% sulfur; small amounts of oxygen and nitrogen; and trace amounts of metals such as iron, nickel, and vanadium. The molecular weights of the constituent compounds may range from several hundred to many thousands. The waterproof layer may be an asphalt-based membrane.

As explained above, ultraviolet light can break down the waterproof layer 16 by breaking polymer chains. As polymer chains break, the waterproof material may become brittle and susceptible to cracking and/or breaking. To protect the waterproof layer 16, the membrane roofing system 10 may include a layer 20 of granules 12 that block and/or may reduce the amount of ultraviolet light that reaches the waterproof layer 16. The granules 12 may be made out of stone, aluminum silicate, barium sulfate, sintered glass, ceramic, etc., and may have a small particle size (e.g., 0.2 mm to 2.4 mm). The particle size may be from 0.2 mm to 0.5 mm, 0.5 mm to 1.0 mm, 1.0 mm to 1.5 mm, 1.5 mm to 2.0 mm, 2.0 mm to 2.5 mm, 2.5 mm to 3.0 mm, 3.0 mm to 3.5 mm, 3.5 mm to 4.0 mm, or over 4.0 mm. The particle size may refer to the diameter of the particle or in instances where the particle is not completely spherical, the particle size may refer to the diameter of a sphere having the same volume as the particle. The median, mean, or mode particle size may be any particle size described herein. The granules 12 may have a greater surface area than regular masonry slab material, such as granite or limestone tile, which may make stain resistance a challenge, especially when the granules 12 may be partially embedded in asphaltic material (e.g., asphaltic chemicals).

In addition to protecting the waterproof layer 16, the granules 12 may reduce energy absorption by the membrane roofing system 10. For example, the granules 12 have a reflectivity of 65% or greater (e.g., 65%, 70%, 80%, 90%, 95% or greater). By reflecting light away from the membrane roofing system 10 the granules 12 may decrease power consumption by climate control systems that cool the building. In addition, the highly reflective cool roof may also reduce the urban heat island effect. Because the granules 12 may be embedded in or otherwise in contact with the waterproof layer 16, the granules 12 may absorb and/or adsorb asphaltic chemicals from the waterproof layer 16. For example, high temperatures may cause asphaltic chemicals to leach out of the waterproof layer 16. If these substances are absorbed and/or adsorbed by the granules 12 they may change the color of the granules 12. A change in granule 12 color changes the reflectivity of the granule 12, which may increase the energy absorbed by the membrane roofing system 10. Granule 12 may be porous.

To maintain the reflectivity of the granules 12, the granules 12 may be coated with a cationic fluorinated (meth)acrylic copolymer and a siloxane-based or a silane-based compound. The coating may be transparent or substantially transparent. The cationic fluorinated (meth)acrylic copolymer may include DuPont ST-100, DuPont ST-110, or a combination thereof. The siloxane-based compound may include cyclic or linear siloxanes. The siloxane-based compound may include polydimethylsiloxane and reactive organosiloxanes. Coatings with siloxane-based compounds may include Evonik Sitren® 270 and Evonik Sitren® 595. Silane-based compounds may include alkylalkoxysilanes. Coatings with silane-based compounds may include DuPont StoneTech® Professional Heavy Duty Exterior Sealer and DuPont StoneTech® Professional Rich Color Enhancer Pro. Coatings with siloxane-based or silane-based compound may include a mixture of a siloxane-based compound and a silane-based compound. Mixtures may include DuPont StoneTech® Professional Salt Water Resistant Sealer, Wacker Chemie AG SILRES® BS1011A, and Wacker Chemie AG SILRES® BS3003. The siloxane-based or silane-based compound may be a component in a coating mixture that may include at least one of deionized water, alcohol (e.g., methanol), ethoxylate, aliphatic hydrocarbons, silicone resin, or butyl acetate. The coating mixture may exclude any one or group of these compounds.

The coating may be from 0.001 wt. % to 3.0 wt. % on a dry basis of the uncoated granule 12. For example, the coating may be from 0.001 wt. % to 0.01 wt. %, from 0.01 wt. % to 0.05 wt. %, from 0.05 wt. % to 0.10 wt. %, from 0.10 wt. % to 0.15 wt. %, from 0.15 wt. % to 0.20 wt. %, from 0.20 wt. % to 0.30 wt. %, from 0.30 wt. % to 0.40 wt. %, from 0.40 wt. % to 0.50 wt. %, from 0.50 wt. % to 0.60 wt. %, from 0.60 wt. % to 0.70 wt. %, 0.70 wt. % to 0.80 wt. %, from 0.80 wt. % to 0.90 wt. %, from 0.90 wt. % to 1.00 wt. %, from 1.00 wt. % to 1.50 wt. %, from 1.50 wt. % to 2.00 wt. %, or from 2.00 wt. % to 3.00 wt. % of the uncoated granule 12.

The coating may include a greater amount of the siloxane-based or silane-based compound than the copolymer. Without intending to be bound by a particular theory, it is thought that a few fluorine atoms of the copolymer may be sufficient to repel oil, while a larger surface area of siloxane-based or silane-based compound may be needed to repel water. The siloxane-based or silane-based compound may be 50 wt. % or more, 60 wt. % or more, 70 wt. % or more, 75 wt. % or more, 85 wt. % or more, or 90 wt. % or more of the coating. The mass ratio of the siloxane-based or silane-based compound may be from 1:1 to 2:1, from 2:1 to 3:1, from 3:1 to 4:1, from 4:1 to 5:1, from 5:1 to 6:1, or greater than 6:1.

The cationic fluorinated (meth)acrylic copolymer may block and/or may reduce adsorption and/or absorption by the granule 12 of asphaltic chemicals in the waterproof layer 16. Accordingly, the granules 12 may protect the waterproof layer 16 as well as maintain their reflectivity. The coated granule may have an oil repellency effective to prevent the coated granule from sinking in a naphthenic oil bath after 28 days. The coated granule may be effective in maintaining at least 91% of the solar reflectivity of the coated granule after 28 days of being aged in an oven at 80° C.

The cationic fluorinated (meth)acrylic copolymer can be either acrylate or methylate copolymer that includes at least fluorinated alkyl containing acrylate/methacrylate monomer, such as 1H, 1H, 2H, 2H-perfluorooctyl acrylate/methacrylate, and amine containing acrylate or methacrylate monomer, such as 2-(dimethylamino) ethyl methacrylate. The amine functionality, in particular tertiary and quaternary, may provide cationic sites along the polymer chain, which enables the polymer to be dispersed in aqueous solution. In addition, the cationic characteristic of the polymer may enable it to wet and adsorb to a cementatious substrate, such as an aluminum silicate based granule 12. The fluorinated alkyl chain of the cationic fluorinated (meth)acrylic copolymer may provide both hydrophobic and lipophobic protection to the granule 12. In some embodiments, the polymer may include a silane containing monomer, such as methacryloxypropyltrimethoxysilane, which may form a covalent bond with the granule 12 increasing adhesion and durability of the coating. In contrast, anionic copolymers made with the same fluorinated alkyl acrylate/methylate co-monomer may wet and coat the surface of the granule 12 poorly and may not provide the same hydrophobic and lipophobic protection.

Figure 2:
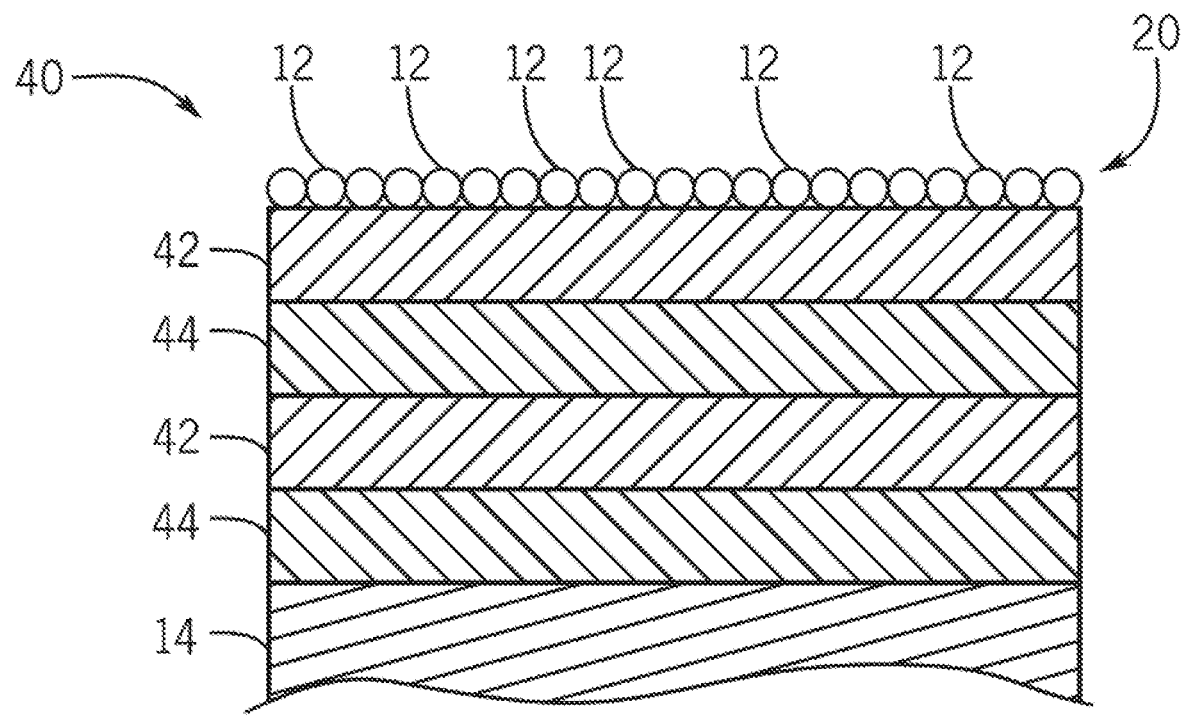
FIG. 2 is a cross-sectional view of a built-up roofing (BUR) system with granules according to embodiments of the present technology.

FIG. 2 is a cross-sectional view of an embodiment of a built-up roof (BUR) system 40 with granules 12. The BUR system 40 may include one or more insulation layers 14 that resist heat transfer through the roof of a building. To protect the insulation layer(s) 14 from the environment (e.g., rain, snow), the BUR system 40 may include one or more waterproof layers or membranes 42. The waterproof layers 42 may be a polymer material such as an asphalt-based material (e.g., Styrene-Butadiene-Styrene (SBS) Modified Asphalt, Atactic Polypropylene (APP) Modified Asphalt, or Oxidized Asphalt Coating) The BUR system 40 may structurally reinforce the waterproof layers 42 with fiberglass, polyester, or fiberglass/polyester combination reinforcement layers 44 (e.g., fiberglass, polyester, or fiberglass/polyester combination reinforcement) that increase the tensile strength and tear resistance of the waterproof layers 42. As illustrated, the fiberglass layers 44 may be placed between the waterproof layers 42 in an alternating manner to strengthen the overall BUR system 40. The insulation layer may be in contact with the waterproof layer.

As explained above, ultraviolet light may negatively affect the waterproof layer material. To protect the waterproof layers 42, the membrane roofing system 10 may include a layer 20 of granules 12 that block and/or reduce the amount of ultraviolet light that reaches the exterior or outermost waterproof layer 42. The granules 12 may be made out of stone, aluminum silicate, barium sulfate, sintered glass, ceramic, etc. In addition to protecting the waterproof layers 42, the granules 12 may reduce energy absorption by the BUR system 40. For example, the granules 12 may have a reflectivity of 65% or greater (e.g., 65%, 70%, 80%, 90%, 95% or greater), By reflecting light away from the BUR system 40, the granules 12 may decrease the amount of energy needed to cool the building. In other words, the granules 12 may reduce power consumption by climate control units (e.g., air conditioning units).

Because the granules 12 may be embedded in or otherwise in contact with the waterproof layers 42 the granules 12 may absorb and/or adsorb color-changing chemicals, oils, etc. from the waterproof layers 42. For example, the high temperatures may cause asphaltic chemicals to leach out of the waterproof layers 42. If these substances are absorbed and/or adsorbed by the granules 12, they can change the color of the granules 12. A change in the granule 12 color changes the granule's reflectivity. To maintain the reflectivity of the granules 12, the granules 12 may be coated with a fluorinated (meth)acrylic copolymer (e.g., DuPont® ST-100, DuPont® ST-110, or a combination thereof) and a siloxane-based or a silane-based compound. The coating may be any coating described herein. The granules may be coated according to any method described herein. The cationic fluorinated (meth)acrylic copolymer may block and/or reduce adsorption and/or absorption by the granule 12 of the chemicals, oils, etc. in the waterproof layers 42.

Accordingly, the granules 12 may protect the waterproof layers 42 as well as may maintain their reflectivity.

Figure 3:
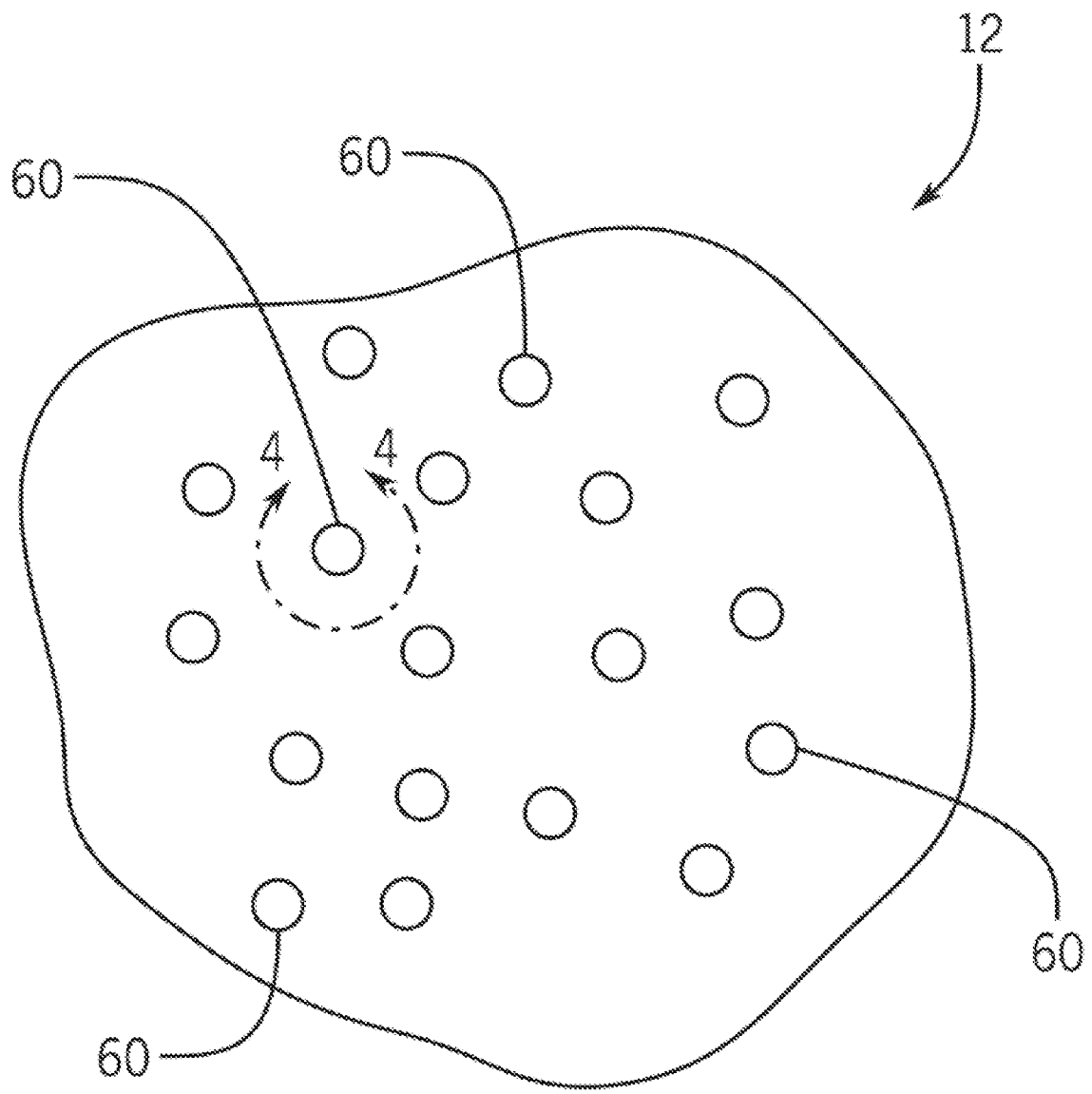
FIG. 3 is a side view of a coated granule according to embodiments of the present technology.

FIG. 3 is a side view of an embodiment of a granule 12 coated with hybrid coating of a siloxane-based or silane-based compound and a fluorinated (meth)acrylic copolymer. The cationic fluorinated (meth)acrylic copolymer may block and/or may reduce absorption/adsorption of asphaltic chemicals in the waterproof layers 16, 42. In some embodiments, the granules 12 may be made out of a porous material. By coating the granules 12 with the hybrid coating, the granules 12 may resist absorbing asphaltic chemicals through the pores 60 and/or adsorbing the asphaltic chemicals. In other words, the hybrid coating may enable the granules 12 to maintain their reflectance by resisting absorption/adsorption of asphaltic chemicals that leach out of the waterproof layers 16, 42. The hybrid coating may be about 0.001% to about 3.0% by weight of an uncoated granule 12. They hybrid coating may be any weight percentage of the uncoated granule described herein.

Figure 4:
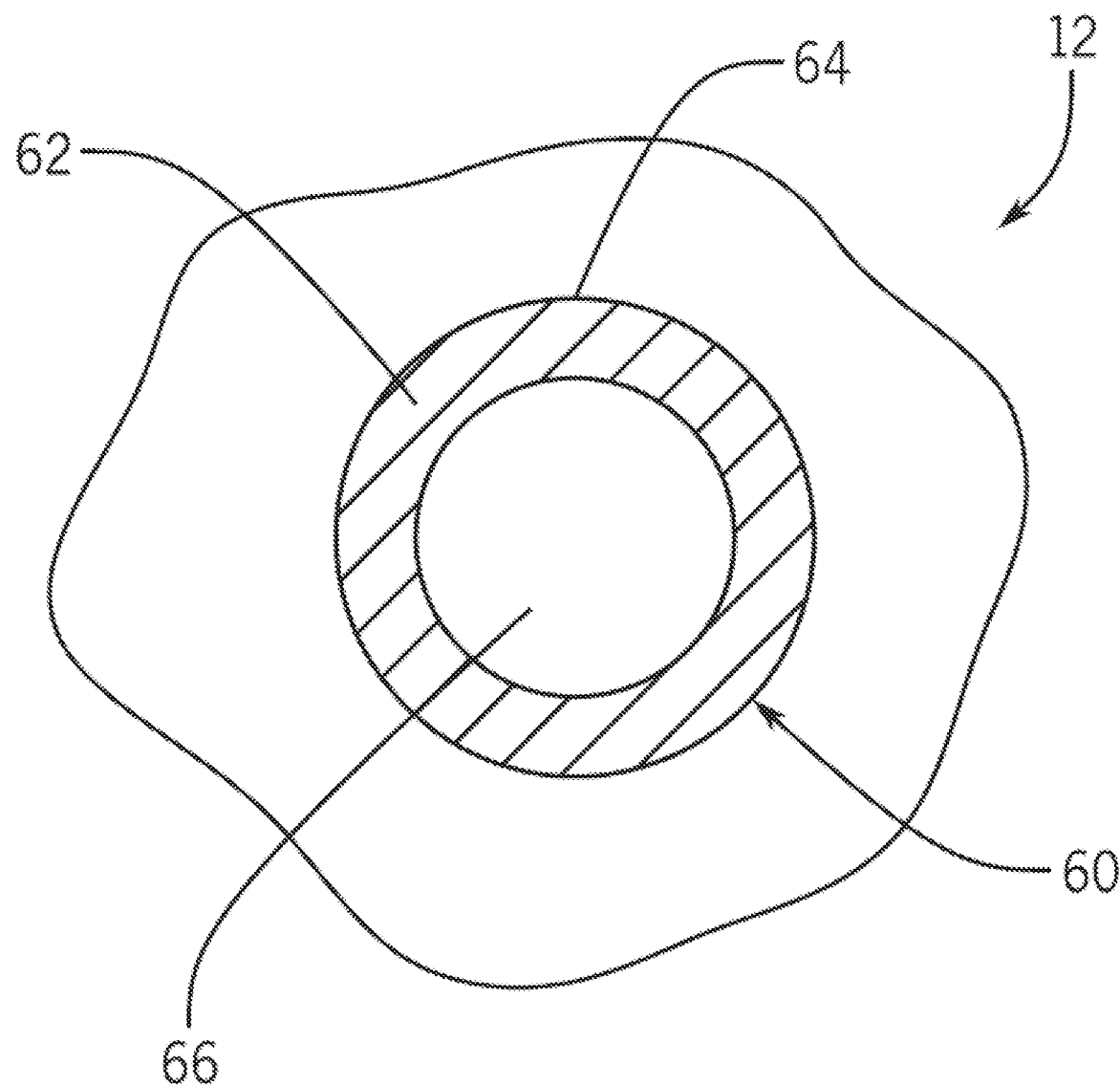
FIG. 4 is a cross-sectional detail view of a pore in a coated granule according to embodiments of the present technology.

FIG. 4 is a cross-sectional detail view of an embodiment of a pore 60 in a granule 12 coated with a hybrid coating of a siloxane-based or silane-based compound and a cationic fluorinated (meth)acrylic copolymer. As illustrated, the hybrid coating may not fill the pore 60; but instead, may coat the interior surface 64 of the pore 60. In some instances, the fluorinated (meth)acrylic copolymer may form a monolayer on the substrate that protects at very low concentrations. This unique characteristics of the hybrid coating may provide granule protection over a wide range of applied concentrations. Even though the interior surface 64 may be covered, the lipophobicity of the cationic fluorinated (meth)acrylic copolymer may block or may reduce absorption of oils into the granule 12 through the aperture 66. In some embodiments, the cationic fluorinated (meth)acrylic copolymer may completely fill the pore 60 blocking oil absorption by the granule 12.

Coating Methods

Figure 5:
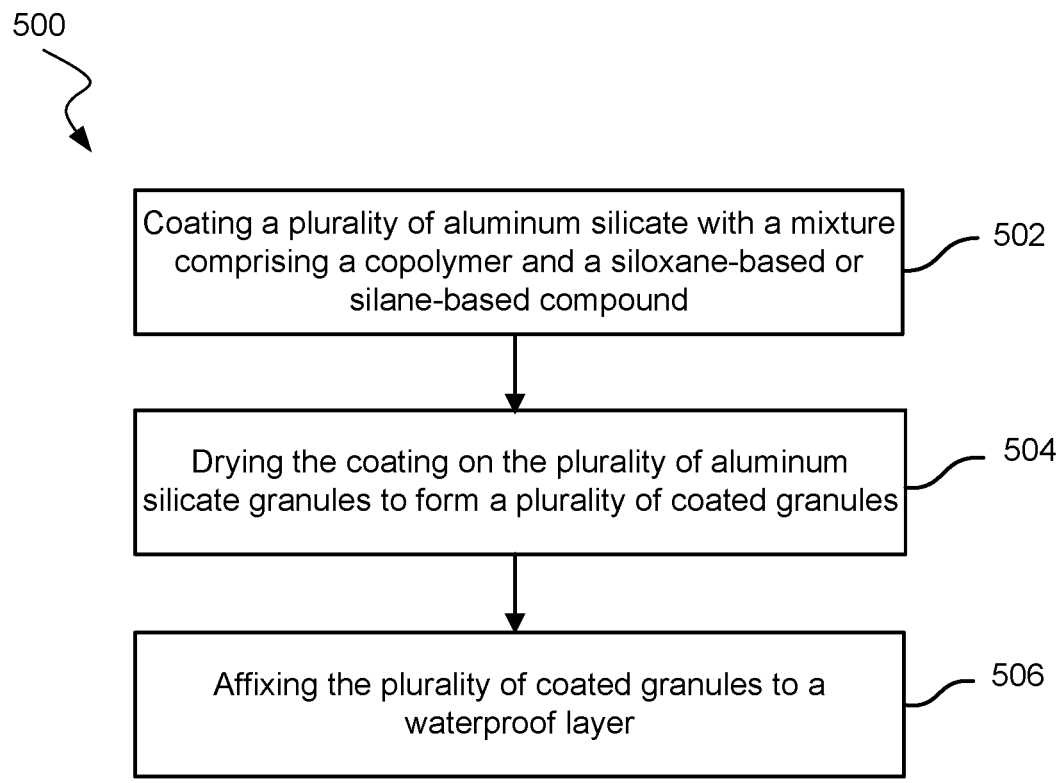
FIG. 5 shows a method of manufacturing a roofing system according to embodiments of the present technology.

FIG. 5 illustrates a method 500 for manufacturing a roofing system. Method 500 may include mixing the copolymer and the siloxane-based or the silane-based compound together to form a mixture. The mixture may be present as a dispersion. The copolymer and the siloxane-based or the silane-based compound may be any compound described herein.

At block 502, method 500 may include coating a plurality of aluminum silicate granules with the mixture. In some embodiments, method 500 may include coating any granule described herein. The plurality of aluminum silicate granules may have a particle size in a range from 0.2 mm to 2.4 mm or any particle size described herein. The plurality of aluminum silicate granules may have a 65% or greater reflectivity. The coating may include a copolymer and a siloxane-based or silane-based compound. The copolymer may be a cationic fluorinated (meth)acrylic copolymer.

The mixture may be applied to granules via direct spray (e.g., quick spray). The concentration of the copolymer and the siloxane-based or silane-based compound may be determined by the liquid pickup of the granule. The coating amount may be any coating amount described herein. In another embodiment, the mixture may be applied via dip coating. The mixture may not be applied to the waterproof layer or any part of a roof system other than the granules.

At block 504, method 500 may also include drying the coating on the plurality of aluminum silicate granules to form a plurality of coated granules. In some embodiments, the granules may be air-dried. In another embodiment, the granules may be dried in an oven (e.g., dried in an oven at about 100° C.). In still other embodiments, the granules may be dried using a combination of air-drying and an oven. In some embodiments, the granules may be recoated with a mixture and then dried again. This may be repeated multiple times (e.g., 1, 2, 3, 4, 5, or more times) to ensure adequate coating of the granules.

At block 506, method 500 may further include affixing the plurality of coated granules to a waterproof layer. The granules may be attached, embedded, or put in contact with the waterproof layer. For example, the waterproof layer (such as waterproof layer 16 or waterproof layer 42) may be in a molten state when the granules are placed on the waterproof layer. As the waterproof layer cools and hardens, the granules may couple to the waterproof layer. In some embodiments, the granules 12 may couple to the waterproof layer 16, 42 with an adhesive.

The plurality of coated granules may have any of the properties, including oil repellency and solar reflectivity, described herein.

In some embodiments, instead of coating the granules and then attaching the granules to the waterproof layer, the granules are first attached to the waterproof layer. In some embodiments, the waterproof layer is in a molten state when the granules are placed on the waterproof layer. As the waterproof layer cools and hardens, the granules may couple to the waterproof layer. In some embodiments, the granules may couple to the waterproof layer with an adhesive.

Once the granules are coupled to the waterproof layer, the granules may be coated with a mixture of the copolymer and siloxane-based or silane-based compound. For example, the granules may be coated via direct spray. In another embodiment, the fluorinated acrylic copolymer coating may be applied via dip coating. For example, the granules and waterproof layer may be dipped together in the mixture. In some embodiments, only a portion of the granules may be dipped in the mixture.

Testing Methods

The ability of a coated granule on a roof to maintain its solar reflectivity over time may be an important property for roofing systems. Conventional methods to directly test the solar reflectivity directly may be time consuming. In addition, solar reflectivity may depend on the geometry of the granule, which may vary from granule to granule. Measuring the oil or water repellency of a granule may serve as a way to indirectly measure how well the granule maintains its solar reflectivity. A granule with a higher oil or water repellency may be expected to better maintain its solar reflectivity. Testing oil or water repellency by adding oil or water to a collection granules may result in only a few granules contacting the liquid. As a result, such tests may have imprecise and inaccurate results. Embodiments of the present technology may allow for a repeatable, accurate, precise, quantitative, and efficient test of repellency, and therefore an improved test for estimating maintenance of solar reflectivity.

Figure 6:
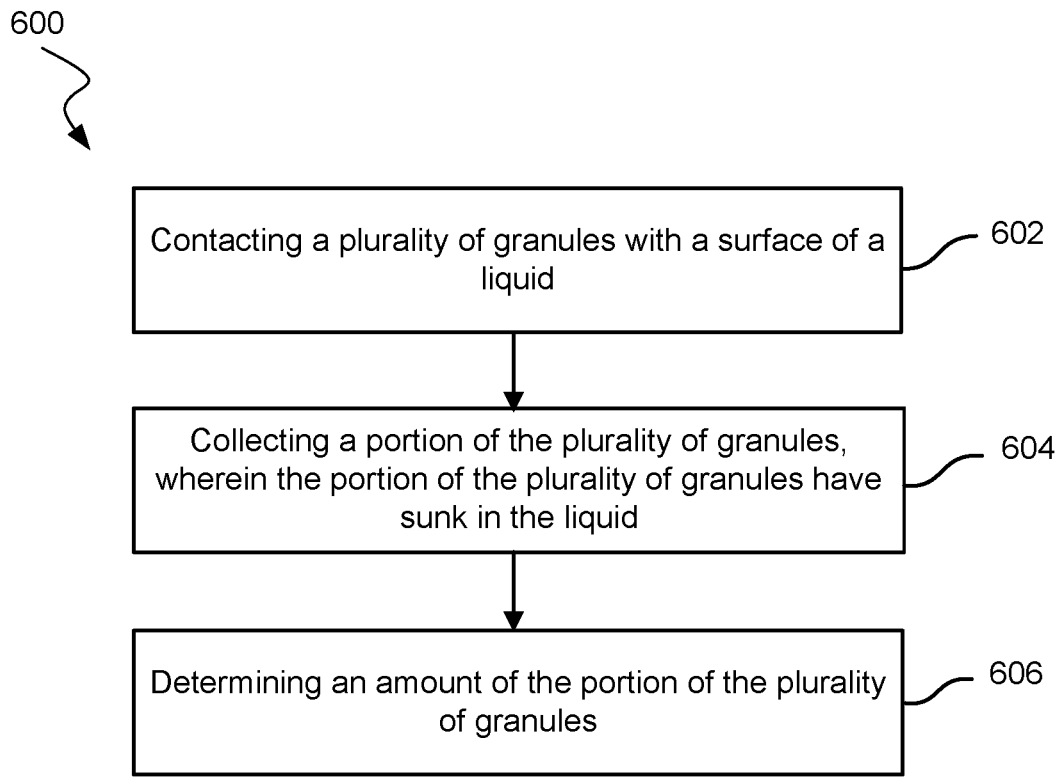
FIG. 6 shows a method of quantifying repellency of a granule according to embodiments of the present technology.

As shown in FIG. 6, embodiments may include a method 600 of quantifying repellency of a granule. Method 600 may include contacting a plurality of granules with a surface of a liquid (block 602). Contacting the plurality of granules with the surface of the liquid may include spreading the granules as a monolayer on the surface. Contacting the plurality of granules may exclude stacking the granules on each other. Contacting the granules may exclude breaking the surface tension of the liquid with a granule by the initial force accompanying the contact. For example, contacting the granules may exclude dropping the plurality of granules onto the surface of the liquid from a height that would cause a granule to submerge the granule in the liquid.

The plurality of granules may include at least 50 granules, at least 100 granules, or at least 150 granules. For example, the plurality of granules may include from 100 to 200 granules. The granules may be any granules described herein. The granules may be coated with any coating described herein.

The liquid may include a naphthenic oil or any oil from an asphalt mix. The surface of the liquid may be characterized by an area ranging from 1 in$^2$ to 100 in$^2$, including from 1 in$^2$ to 2 in$^2$, from 2 in$^2$ to 10 in$^2$, from 10 in$^2$ to 20 in$^2$, from 20 in$^2$ to 50 in$^2$, or from 50 in$^2$ to 100 in$^2$.

Method 600 may also include collecting a portion of the plurality of granules, where the portion of the plurality of granules have sunk in the liquid (block 604). The portion of the plurality of granules that sink may be a result of the liquid penetrating the granule. Collecting the portion of the plurality of granules may follow contacting the plurality of granules by a time ranging from 0 minutes to 30 minutes, from 30 minutes to 60 minutes, from 1 hour to 2 hours, from 2 hours to 3 hours, or after 3 hours.

Method 600 may further include determining an amount of the portion of the plurality of granules (block 606). The portion of the plurality of granules may be dried before the amount is determined. Drying may be by any suitable technique including applying heat or washing away the liquid with another solvent. The amount may be the mass of the portion of the plurality of granules. The amount may be a ratio calculated from granules that have sunk and granules that have not sunk. The ratio may be a ratio of granules that have sunk to total granules. A lower amount may indicate a higher repellency of the granule and/or coating to the liquid. If the liquid is naphthenic oil, the amount may correlate with the resistance of the granule to staining from asphalt or other compounds in roofing systems.

Method 600 may include comparing the amount of the portion of the plurality of granules to a threshold value. The threshold value may be a predetermined minimum value. In some instances, the threshold value may be a value measured for a different type of granule in the same liquid. The granule and/or the coating of the granule may be evaluated for suitability in roofing or other applications based on the comparison of the amount to the threshold value. For example, if the amount is lower than the threshold value, the granule and/or coating may be evaluated to be better suited for roofing or other applications than another type of granule and/or coating. As a result, method 600 may result in an improved granule and/or roofing system.

Method 600 may further include collecting a second portion of the plurality of granules that have sunk in the liquid. Collecting the second portion may occur at least 1 day, 2 days, 3, days, 4 days, or 5 days after collecting the first portion. Method 600 may also include determining the amount of the second portion of the plurality of granules. Method 600 may include collecting additional portions of the plurality of granules that have sunk over time and determining the amounts of these portions. The amounts may be compared to threshold values, and the granule and/or coating may be evaluated based on the comparison.

EXAMPLES

Example 1

Blends of 25 wt. % siloxane and 75 wt. % DuPont ST-110 copolymer were coated on aluminum silicate granules at different levels. Coating levels of a mixture of water, siloxane, and the copolymer included 0.26 wt. %, 0.33 wt. %, 0.63 wt. %, 0.66 wt. %, 1.31 wt. %, and 1.56 wt. %. About 60% of the mixture was water and about 40% of the mixture was a solid. As a result, the final coating levels of the granule after drying were 0.10 wt. %, 0.13 wt. %, 0.25 wt. %, 0.26 wt. %, 0.52 wt. %, and 0.62 wt. %. A control of a mixture of siloxane-based compound and silane-based compound without a fluorinated copolymer (Wacker Chemie AG SILRES® BS3003) was coated on an aluminum silicate granule at 0.93 wt. %.

Example 2

The coated aluminum silicate granules of Example 1 were tested for long-term oil repellency. A bath of naphthenic oil was prepared. The granules were placed in a naphthenic oil bath by carefully spreading the granules on top of the surface of the naphthenic oil. The weight percent of granules that sink in the oil bath is tracked over 28 days, starting from 30 minutes after placing the granules in the naphthenic oil bath. The weight percent of granules that sink is calculated from the weight of the granules that sink divided by the weight of all granules.

Figure 7:
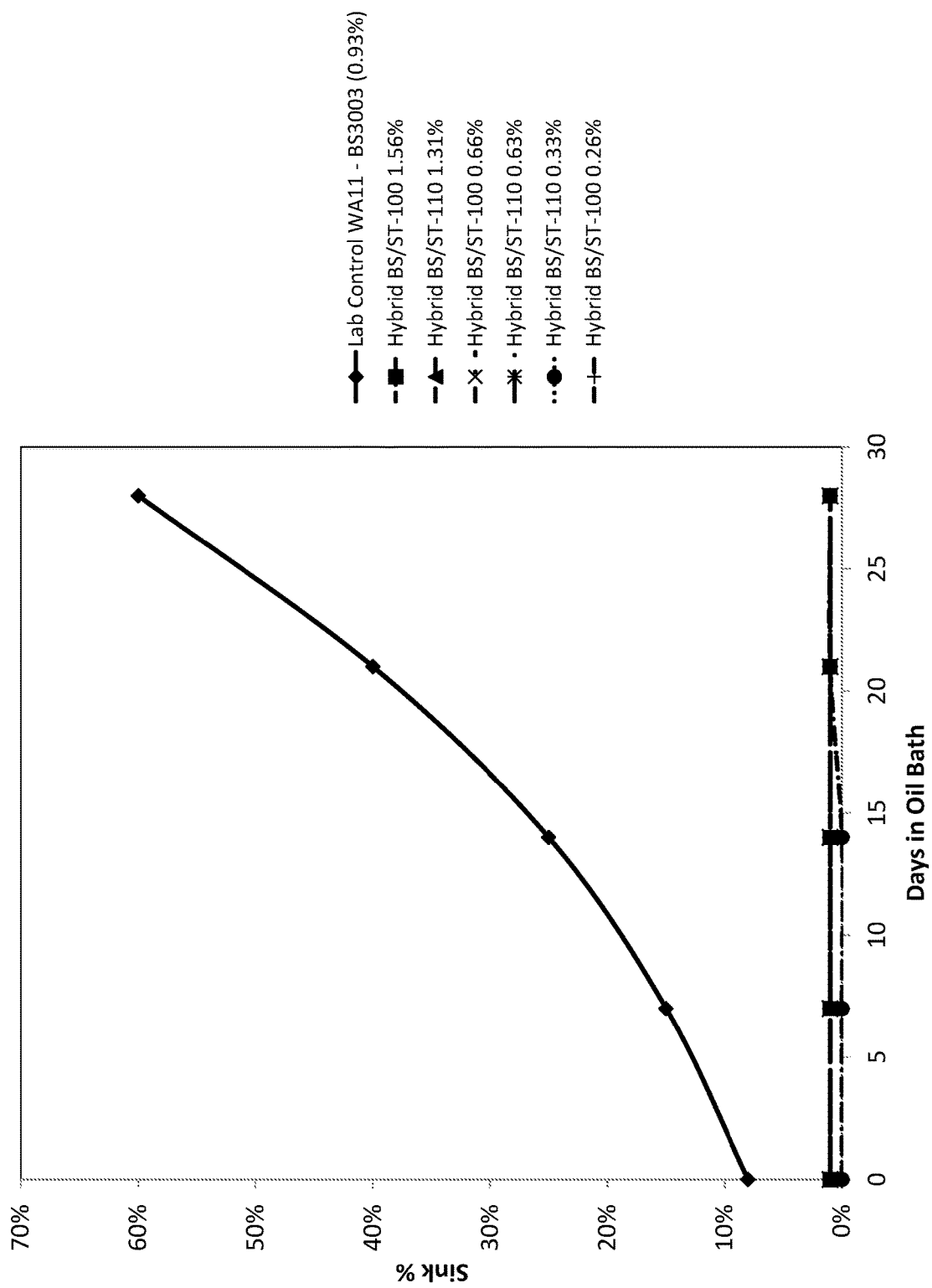
FIG. 7 shows a graph of the results of a long-term oil repellency test according to embodiments of the present technology.

FIG. 7 shows the results of the long-term oil repellency test with the sink percentage of the granules on the y-axis and days in the oil bath on the x-axis. The control started with near 10 wt. % of granules sinking in the oil bath. Over the course of 28 days, more and more control granules sink, up to 60 wt. % after 28 days. By contrast, granules coated with blends of siloxane and copolymer showed close to 0 wt. % granules sinking initially. Over the course of 28 days, few, if any, additional granules sink. All of the hybrid coatings, regardless of coating, had lower sink percentage than the control. Fewer granules sinking in the naphthenic oil bath is an indication of the oil repellency of the granules. Granules that absorb the naphthenic oil will sink, while granules that can repel the naphthenic oil will float. A greater repellency for oil may indicate a greater repellency for asphalt and other oils that may decrease the reflectivity of the granules.

Example 3

The coated aluminum silicate granules of Example 1 were tested for solar reflectivity trends under simulated aging conditions. The granules were exposed to thermal conditions typical on a commercial low-slope roof. Samples were assembled by applying granules to an SBS-modified bituminous membrane and then measured for initial solar reflectivity and periodically measured for solar reflectivity over time with exposure to dark oven thermal aging at 80° C.

The bituminous membrane was prepared by die cutting a controlled SBS-modified membrane using a 3.0-oz tin cup. Then the membrane was removed from the cup and secured in the lid of the tin cup. For large samples of granules, a sample splitter was used to pare down the size of the sample in order to maintain a representative particle size distribution. The granules were placed in a new 3.0-oz tin and hand rotated several times in different rotational directions to insure the granules were not size segregated. Samples were prepared by evenly heating the surface of the bituminous membrane with a natural gas burner until it was molten. The granules were immediately poured in excess over the molten surface. The flat tin cup bottom was used to apply light pressure to the top of the sample for a few seconds, and then the samples were turned over to remove the excess granules. Once again, the flat tin cup bottom was used to apply very light pressure to the CR granules remaining on the sample. Samples were allowed to cool for approximately 30 minutes before shaking off any remaining loose granules.

An initial solar reflectometer reading of the coated granules was taken. The coated granules and membrane were then placed in a 80±1° C. forced-air convection oven after the initial reading. The solar reflectivity was measured every seven days over 28 days.

Figure 8:
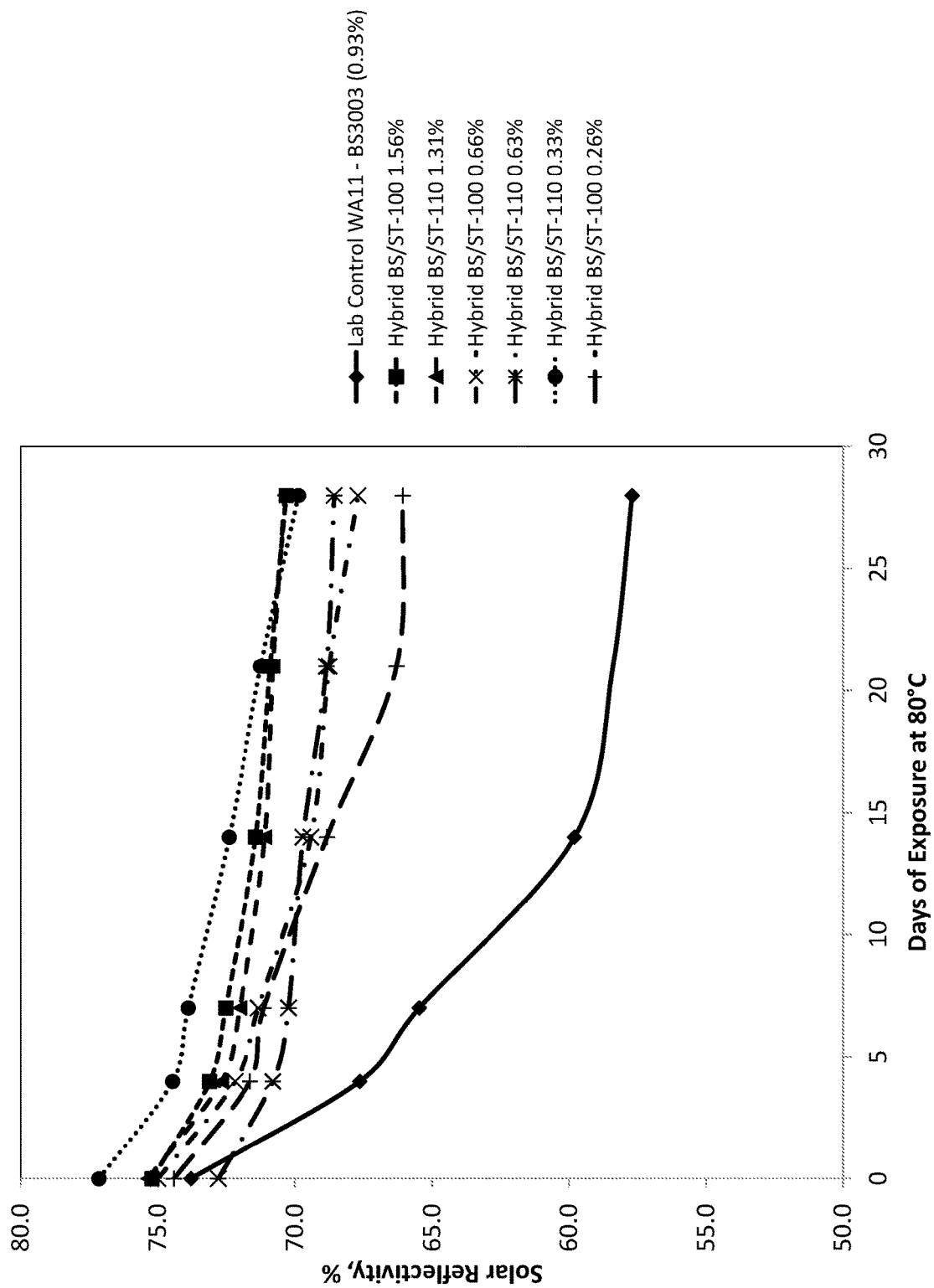
FIG. 8 shows a graph of the results of a solar reflectivity test according to embodiments of the present technology.

FIG. 8 shows the results of the solar reflectivity trend as a result of staining with the solar reflectivity percentage on the y-axis and days of exposure at 80° C. on the x-axis. The decrease in the solar reflectivity was likely a result of the granules becoming stained with the light molecular weight portion of an asphalt mix (including naphthenic oil) from the membrane. The control granule lost 16.1% of its day 0 solar reflectivity by day 28. The granules coated with siloxane and copolymer lost from 4.2% to 8.4% of its solar reflectivity by day 28. Higher coating percentages of the hybrid coatings were observed to have less of a decrease in solar reflectivity compared to lower coating percentages. However, even at coating percentages less than the control coating level of 0.93%, hybrid coatings from 0.26% to 0.66% were observed to outperform the control. This example shows that the hybrid coatings are likely to retain solar reflectivity better than a siloxane-only coating when used as part of a roofing system.

Example 4

Aluminum silicate granules are coated with a siloxane-based or a silane-based compound by itself, a fluorinated (meth)acrylic copolymer by itself, and a hybrid coating of the siloxane-based or silane-based compound and the fluorinated (meth)acrylic copolymer. Different coating levels of each coating are tested for oil repellency and water repellency. The results show that a hybrid coating was more effective in repelling oil and/or water than if each coat is used separately. In addition, the results show that the hybrid coating is more effective in repelling oil and/or water than even adding together the individual results of using each coating separately. As a result, the combination of the two components in the hybrid coating shows a synergistic effect.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the particle" includes reference to one or more particles and equivalents thereof known to those skilled in the art, and so forth. The invention has now been described in detail for the purposes of clarity and understanding. However, it will be appreciated that certain changes and modifications may be practice within the scope of the appended claims.

All publications, patents, and patent applications cited herein are hereby incorporated by reference in their entirety for all purposes. None is admitted to be prior art.

What is claimed is:

1. A coated granule for roofing systems, the coated granule comprising:
   an aluminum silicate granule; and
   a coating disposed on the aluminum silicate granule, the coating comprising:
      a copolymer, and
      a siloxane-based or a silane-based compound;
   wherein:
      the siloxane-based or silane-based compound is 60 wt. % or more of the coating and a mass ratio of the siloxane-based or silane-based compound to the copolymer is from 2:1 to 3:1,
      the copolymer is a cationic fluorinated (meth)acrylic copolymer,
      the aluminum silicate granule has a particle size in a range from 0.2 mm to 2.4 mm, and
      the aluminum silicate granule has a 65% or greater reflectivity.

2. The coated granule of claim 1, wherein the coating is from 0.25 wt. % to 1.56 wt. % of the aluminum silicate granule.

3. The coated granule of claim 1, wherein the siloxane-based or silane-based compound is 75 wt. % or more of the coating.

4. The coated granule of claim 3, wherein the coating is from 0.25 wt. % to 0.90 wt. % of the coated granule.

5. The coated granule of claim 1, wherein the coated granule has an oil repellency effective to prevent the coated granule from sinking in a naphthenic oil bath after 28 days.

6. The coated granule of claim 1, wherein the coating is effective in maintaining at least 91% of the reflectivity of the coated granule after 28 days in an oven at 80° C.

7. The coated granule of claim 1, wherein the coating is transparent.

8. The coated granule of claim 1, wherein the coating comprises the siloxane-based compound.

9. The coated granule of claim 1, wherein the coating comprises from 0.001 wt. % to 3.0 wt. % on a dry basis of the aluminum silicate granule.

10. The coated granule of claim 1, wherein the cationic fluorinated (meth)acrylic copolymer comprises methacryloxypropyltrimethoxysilane.

11. A method of manufacturing a coated granule, the method comprising:
coating a plurality of aluminum silicate granules with a mixture comprising:
a copolymer, and
a siloxane-based or silane-based compound, wherein the siloxane-based or silane-based compound is 60 wt. % or more of the coating and a mass ratio of the siloxane-based or silane-based compound to the copolymer is from 2:1 to 3:1; and
drying the coating on the plurality of aluminum silicate granules to form a plurality of coated granules, wherein:
the copolymer is a cationic fluorinated (meth)acrylic copolymer,
the plurality of aluminum silicate granules has a particle size in a range from 0.2 mm to 2.4 mm, and
the plurality of aluminum silicate granules has a 65% or greater reflectivity.

12. The method of claim 11, wherein the plurality of coated granules has an oil repellency effective to prevent greater than 98% of the plurality of coated granules from sinking in a naphthenic oil bath after 28 days.

13. The method of claim 11, wherein the coating on the plurality of coated granules is effective to maintain at least 91% of the reflectivity of the coated granule after 28 days of being aged in an oven at 80° C.

14. The method of claim 11, further comprising mixing the copolymer and the siloxane-based or the silane-based compound to form the mixture.

15. The method of claim 11, wherein coating the plurality of aluminum silicate granules with the mixture further comprises direct spraying the mixture onto the plurality of aluminum silicate granules.

16. The method of claim 11, wherein coating the plurality of aluminum silicate granules with the mixture further comprises dip coating the mixture onto the plurality of aluminum silicate granules.

17. The method of claim 11, wherein drying the coating on the plurality of aluminum silicate granules to form the plurality of coated granules further comprises drying the coating on the plurality of aluminum silicate granules in an oven.

18. A method of manufacturing a coated granule, the method comprising:
coating a plurality of aluminum silicate granules with a hybrid coating, wherein the hybrid coating comprises:
a copolymer comprising a cationic fluorinated (meth)acrylic copolymer, wherein the cationic fluorinated (meth)acrylic copolymer reduces absorption of asphaltic chemical by the aluminum silicate granules; and
a siloxane-based or silane-based compound, wherein the siloxane-based or silane-based compound:
is 60 wt. % or more of the coating;
comprises a mass ratio of the siloxane-based or silane-based compound to the copolymer is from 2:1 to 3:1; and
comprises at least one of polydimethylsilxane or organosiloxane,
wherein the hybrid coating, when coated onto an uncoated aluminum silicate granule, comprises from 0.001% to 3.0% by weight of the uncoated aluminum silicate granule; and
drying the coating on the plurality of aluminum silicate granules to form a plurality of coated granules,
wherein:
the copolymer is a cationic fluorinated (meth)acrylic copolymer,
the plurality of aluminum silicate granules has a particle size in a range from 0.2 mm to 2.4 mm, and
the plurality of aluminum silicate granules has a 65% or greater reflectivity.

19. The method of claim 18, wherein the cationic fluorinated (meth)acrylic copolymer comprises at least one fluorinated alkyl chain.

20. The method of claim 18, wherein the cationic fluorinated (meth)acrylic copolymer comprises a silane containing monomer, wherein the silane containing monomer comprises is methacryloxypropyltrimethoxysilane.

* * * * *